July 27, 1926.

G. L. GERICK ET AL 1,593,935

KNIFE GUARD

Filed Sept. 3, 1925

INVENTORS
George L. Gerick
Louis T. Torres
BY John Q. Naismith
ATTORNEY

Patented July 27, 1926.

1,593,935

UNITED STATES PATENT OFFICE.

GEORGE L. GERICK AND LOUIS T. TORRES, OF SAN JOSE, CALIFORNIA, ASSIGNORS OF ONE-THIRD TO GEORGE W. LYLE, OF SAN JOSE, CALIFORNIA.

KNIFE GUARD.

Application filed September 3, 1925. Serial No. 54,241.

In cutting fruit for canning a special form of knife is used, this knife having a comparatively short handle and a longer sharply pointed blade. It is, of course, necessary that this blade be kept sharp at all times with the result that through accidents or carelessness many bad cuts are received by the workers outside of working hours when they are carrying these unguarded knives about with them.

It is the object of the present invention to provide a guard for the cutting edge and point of the knife that may be quickly and easily snapped into position thereon or removed therefrom, that will be easily cleaned, that will stand rough usuage, and that will be economical to manufacture, light in weight, strong, durable, and highly efficient in its practical application.

In the drawing:—

Figure 1:
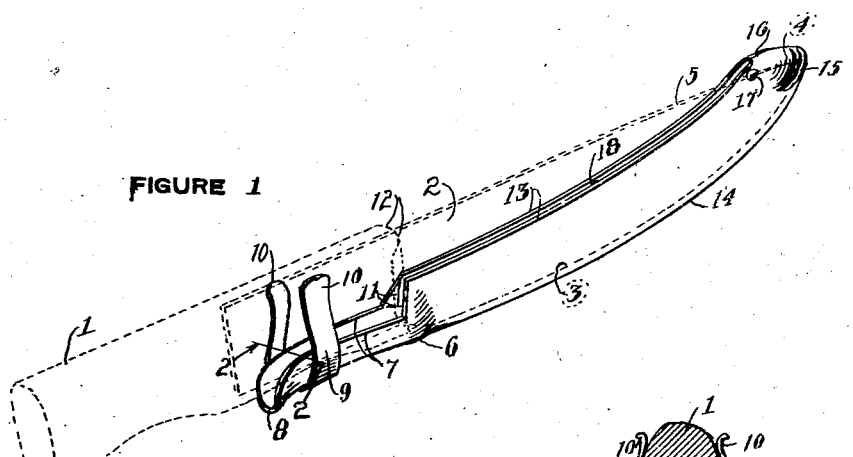
Figure 1 is a perspective illustration of our improved knife guard in position on a knife.
Figure 2:
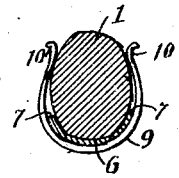
Figure 2 is a view on line 2—2 Figure 1.
Figure 3:
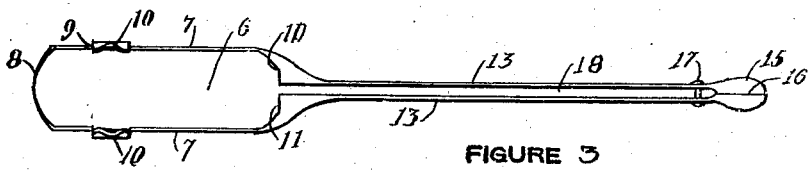
Figure 3 is a plan view of our improved knife guard.

Referring more particularly to the drawing, we indicate a fruit cutting knife handle at 1 carrying a blade 2 with a cutting edge at 3 and a sharp point at 4, the upper blunt edge of the knife being indicated at 5.

At 6 we show a metal element having one end curved transversely as at 7 to conform somewhat to the curvature of knife handle 1 and curved outwardly from the handle to form a lip 8. Mounted on this end portion 7 is a resilient clasp 9 having its upper edges turned outwardly to form lips 10—10. The two sides of part 6 are brought towards each other to form shoulders 11—11 adapted to seat solidly on shoulders 12—12 of knife handle 1 and to form the two sides 13—13 of the guard spaced apart slightly more than the thickness of the blade 2 and having a curved bottom 14 of substantially the same curve as the cutting edge 3 of blade 2.

The ends of these sides 13—13 are cut and formed to form a bulbous tip 15 for the guard, the edges of this end portion being brought together as at 16 to form a closed pocket for the point of the blade 2. A rivet is inserted as shown at 17 to hold the side parts together and to form a stop under which the end of the blade is inserted as shown.

In placing this guard on the knife it is only necessary to insert the point 4 of the blade in the slot 18 and under rivet 17 and then snap the clasp 9 onto the handle 1. The bulbous enclosing end 15 now forms a perfect guard for the end of the blade, and the engagement of the shoulders 11—11 of the guard with the shoulders 12—12 of the handle 1 provides a positive stop which effectually prevents any sudden blow at either end from forcing the point of the knife through the end of the guard.

In removing the guard the ends 10—10 of clasp 9 may first be pushed downward a little way and then the thumb inserted in the lip 8 and the guard pushed entirely off of the handle and blade. This formation and method of removal facilitates handling the guard as it leaves the same grasped by the fore-finger and thumb ready for disposing in a pocket or other receptacle.

The formation of the tip forms a complete guard for the end of the blade 2 and also prevents the guard from working injury upon whatever it may come in contact with, such as the fabric of the pocket in which it may be placed.

It is clear that a device such as described may readily be made out of one piece of metal bent and formed as set forth, with a rivet or other suitable element inserted at 17 to function as described.

It is to be understood, of course, that while we have herein shown and described but one specific embodiment of the invention, changes in form construction and method of application may be made within the scope of the appended claims.

We claim:

1. A knife guard comprising a longitudinally slotted sheathing element adapted to receive a knife blade and having a pocket formed in one end thereof to receive the point of the knife blade and a spring clip mounted on the other end and adapted to engage the knife handle.

2. A knife guard comprising a longitudinally slotted element adapted to receive a knife blade and having a pocket formed in one end thereof to receive the point of the knife blade and a shoulder at the other end adapted to engage one end of the knife handle and a part extending beyond said shoulder and paralleling the knife handle, and a resilient clasp carried by said extension and adapted to engage the knife handle.

LOUIS T. TORRES.
GEORGE L. GERICK.